(12) United States Patent  
Stelter et al.

(10) Patent No.: US 9,010,876 B2
(45) Date of Patent: Apr. 21, 2015

(54) SPINDLE ASSEMBLY FOR SELF-PROPELLED VEHICLE

(75) Inventors: Anthony J. Stelter, Oconomowoc, WI (US); David A. Dull, Oak Creek, WI (US)

(73) Assignee: Allis-Roller LLC, Franklin, WI (US)

( * ) Notice: Subject to any disclaimer, the term of this patent is extended or adjusted under 35 U.S.C. 154(b) by 384 days.

(21) Appl. No.: 13/530,954

(22) Filed: Jun. 22, 2012

(65) Prior Publication Data

US 2012/0326489 A1 Dec. 27, 2012

Related U.S. Application Data

(60) Provisional application No. 61/500,023, filed on Jun. 22, 2011.

(51) Int. Cl.
*B60B 23/00* (2006.01)
(52) U.S. Cl.
CPC ........................................ *B60B 23/00* (2013.01)
(58) Field of Classification Search
CPC ...... B60B 35/121; B60B 23/00; B60B 3/147; F16D 11/14; F16D 11/004
USPC ............... 301/105.1, 111.01, 111.03, 111.05, 301/124.1, 137; 180/247; 403/1; 418/69
See application file for complete search history.

(56) References Cited

U.S. PATENT DOCUMENTS

| | | | | |
|---|---|---|---|---|
| 3,123,169 A | * | 3/1964 | Young et al. ................... | 180/247 |
| 3,637,243 A | * | 1/1972 | Kitano et al. ..................... | 403/1 |
| 3,960,230 A | * | 6/1976 | Van Wuytswinkel ........ | 180/9.62 |
| 4,282,949 A | * | 8/1981 | Kopich et al. .................. | 180/252 |
| 4,588,322 A | * | 5/1986 | Shoemaker et al. .............. | 403/1 |
| 5,261,801 A | * | 11/1993 | Stone .............................. | 418/69 |
| 6,312,238 B1 | * | 11/2001 | Gerlach .......................... | 418/69 |
| 6,607,049 B2 | * | 8/2003 | Cigal ............................. | 180/305 |
| 8,795,130 B2 | * | 8/2014 | Forrest .......................... | 475/302 |
| 2002/0125060 A1 | * | 9/2002 | Cigal ............................. | 180/305 |

* cited by examiner

*Primary Examiner* — Kip T Kotter
(74) *Attorney, Agent, or Firm* — Jeffrey L. Thompson; Thompson & Thompson, P.A.

(57) ABSTRACT

A spindle assembly includes a main housing, a spindle mounted for rotation within the housing, a wheel hub attached to the spindle, a coupling located adjacent to an inner end of the spindle, and a disconnect shaft located within a bore of the coupling. The disconnect shaft is moveable in an axial direction between an engaged position in which a splined portion of the disconnect shaft mates with splined portions of both the spindle and the coupling to prevent the spindle from rotating independently of the coupling, and a disengaged position that allows the spindle to free-wheel relative to the coupling. A sprocket or gear is connected to an inner end of the coupling to connect the spindle assembly to a drive motor. An actuator is connected to an inner end of the disconnect shaft to move the shaft between its engaged and disengaged positions.

20 Claims, 6 Drawing Sheets

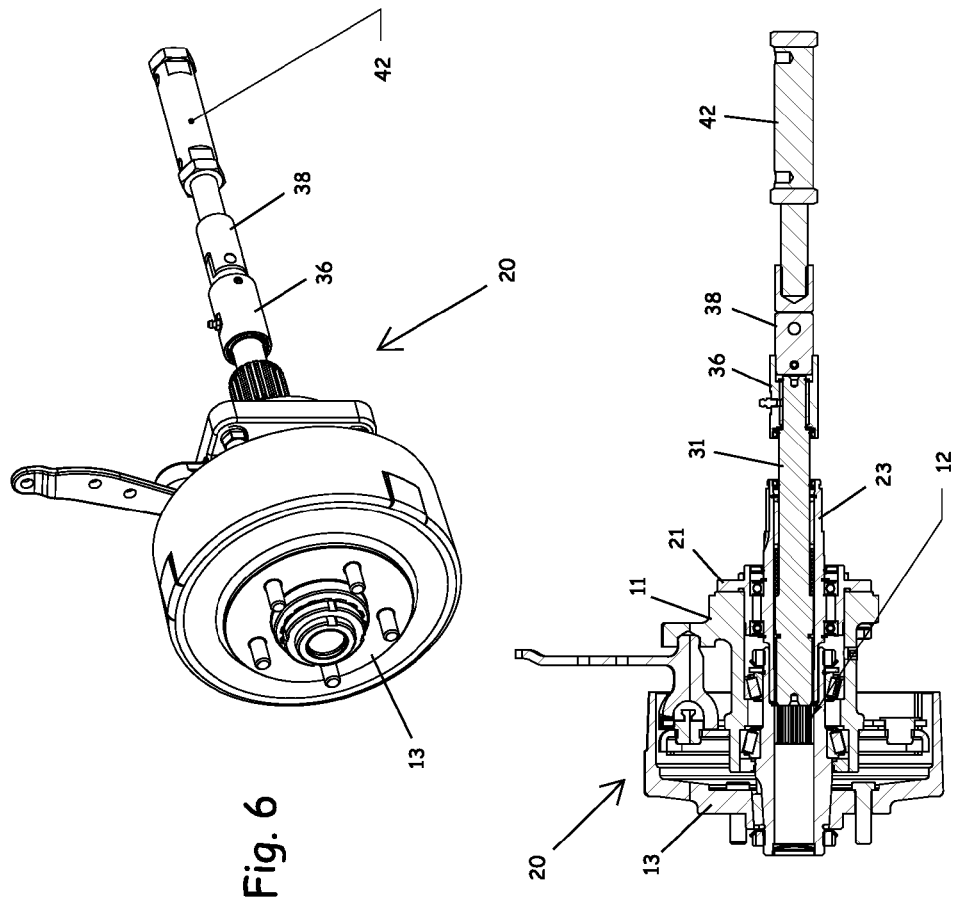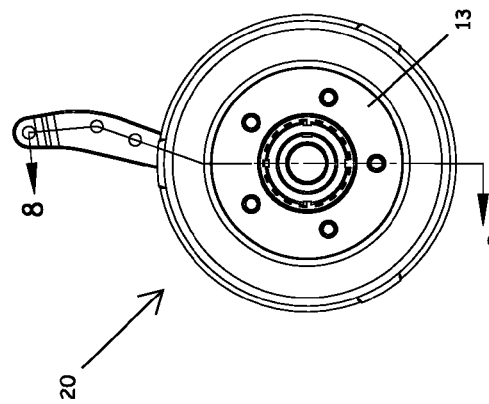

SPINDLE ASSEMBLY FOR SELF-PROPELLED VEHICLE

RELATED APPLICATIONS

This application claims priority of U.S. Provisional Application No. 61/500,023 filed on Jun. 22, 2011. The content of this prior application is incorporated herein by reference.

BACKGROUND OF THE INVENTION

1. Field of the Invention

The present invention relates generally to spindle assemblies for self-propelled vehicles, and particularly to spindle assemblies having a coupling for disconnecting the spindle from a drive motor to provide a free-wheeling mode.

2. Description of the Related Art

A conventional spindle assembly 10 for self-propelled vehicles is illustrated in FIGS. 1 and 2. The conventional spindle assembly 10 provides a bearing and hydraulic motor disconnect package for use in the towable equipment market. It allows an equipment operator to do two primary functions:
1. Tow a vehicle from one job site to another when the spindle assembly is in the "disconnected" or "free-wheeling" mode; and
2. Once at a job site, to engage the vehicle's self-propelling drive system by means of a movable splined shaft connecting a hydraulic motor to the equipment's wheels.

Typically, two spindle assemblies are used on vehicles, but some vehicles have only one. Major components of the conventional spindle assembly are shown in FIGS. 1 and 2 and include: a housing 11, a spindle 12, a wheel hub 13, a disconnect shaft 14, bearings 15, and a coupling 16.

The housing 11 contains the bearings 15 and spindle 12. The spindle 12 is splined in the center to allow for the connecting and disconnecting of the spindle assembly 10 from the hydraulic motor (not shown), as well as mounting of the wheel hub 13 where the vehicle's tire rim will attach. The disconnect shaft 14 is also splined and slides between the spindle 12 and the coupling 16 depending on which mode (connected or disconnected) the equipment operator requires. Pulling the shaft 14 out disengages the unit and places it in free-wheeling mode. A positive lock-out is included to assure the shaft 14 will not engage the coupling 16 while the vehicle is being towed. When the shaft 14 is allowed to engage into the coupling 16, the unit is placed in connected mode, and the vehicle can be moved on a job site with its own power. The conventional spindle assembly 10 allows for the mounting of the hydraulic motor directly to the housing 11 where the splined drive shaft on the motor will engage into the coupling 16 thus providing power to the wheels of the vehicle.

The hydraulic motor shaft is directly engaged into the coupling 16. This arrangement relies solely on the motor and hydraulic drive system for performance of the vehicle and smoothness of operation around the job site. However, in certain cases, optimal performance cannot be achieved with the motor based on the design of the hydraulic system or because of limitations with the hydraulic motor.

In the conventional spindle assembly 10, equipment operators must manually disengage the disconnect shaft 14 on each wheel with a handle 17 located in the center of the wheel. This handle 17 is located on the outboard side of the vehicle. While no fault of the design, operators often neglect to disengage the handle 17 when leaving a job site. This causes the torque from the vehicle's wheels to be transferred back from the road through the spindle 12 and into the hydraulic motor. The result often leads to damage occurring to the internal splines on the coupling 16, disconnect shaft 14 and/or spindle 12, as well as damage to the hydraulic motor. The conventional design does not allow for an efficient way to disconnect the spindle assembly 10 with the disconnect handle 17 in the existing location because anything that is added will greatly complicate tire changes if a flat occurs. Any change to the design will only add length to the disconnect handle 17, and that would lead to damage if the vehicle comes in close contact with another object when clearances at a job site are an issue.

There is a need in the industry for an improved spindle assembly having a disconnect feature for use with self-propelled vehicles to provide a free-wheeling mode.

SUMMARY OF THE INVENTION

An object of the present invention is to provide an improved spindle assembly for use with a towable, self-propelled vehicle.

A further object of the present invention is to provide a spindle assembly that allows a hydraulic, pneumatic, electronic or mechanical system to be used to disengage the spindle from the drive motor.

A further object of the present invention is to provide a spindle assembly that can be driven by a drive motor positioned off the centerline of the spindle, with or without gear reduction.

A still further object of the present invention is to provide a modular spindle assembly that can be configured for either manual or automatic disengagement of the spindle from the drive motor.

To accomplish these and other objects, the present invention provides a spindle assembly having a main housing, a spindle mounted for rotation within the housing, a wheel hub attached to the spindle, a coupling located adjacent to an inner end of the spindle, and a disconnect shaft located within a bore of the coupling. The disconnect shaft is moveable in an axial direction between an engaged position in which a splined portion of the disconnect shaft mates with splined portions of both the spindle and the coupling to prevent the spindle from rotating independently of the coupling, and a disengaged position that allows the spindle to free-wheel relative to the coupling. A sprocket or gear is connected to an inner end of the coupling to connect the spindle assembly to a drive motor. An actuator is connected to an inner end of the disconnect shaft to move the shaft between its engaged and disengaged positions.

According to one aspect of the present invention, a spindle assembly is provided for use in a drive system of a vehicle, comprising: a main housing having an outer side and an inner side; a spindle mounted for rotation within the housing, the spindle having an outer end and an inner end and a first bore extending between the outer and inner ends, the outer end protruding from the outer side of the housing, and at least a portion of the first bore having splines; a wheel hub attached to the spindle adjacent to the outer end; a coupling located adjacent to the inner end of the spindle, the coupling having a second bore extending through a center thereof, and at least a portion of the second bore having splines; and a disconnect shaft located within the second bore of the coupling. The disconnect shaft has a splined portion and is moveable in an axial direction between an engaged position in which the splined portion of the disconnect shaft mates with the splined portions of both the spindle and the coupling to prevent the spindle from rotating independently of the coupling, and a disengaged position in which the splined portion of the disconnect shaft is disengaged from the splined portion of the spindle to allow the spindle to rotate independently of the coupling.

According to another aspect of the present invention, a modular spindle assembly is provided for use in a drive system of a vehicle, comprising: a main housing having an outer side and an inner side; a spindle mounted for rotation within the housing, the spindle having an outer end and an inner end and a first bore extending between the outer and inner ends, the outer end protruding from the outer side of the housing, and at least a portion of the first bore having splines; and a wheel hub attached to the spindle adjacent to the outer end. The modular assembly has a first disconnect configuration for use with a hydraulic drive motor mounted directly to the housing, the first disconnect configuration comprising a first coupling located adjacent to the inner end of the spindle and engaged with a splined drive shaft on the motor, and a first disconnect shaft having a splined portion and being moveable in an axial direction between an engaged position in which the splined portion of the first disconnect shaft mates with splined portions of both the spindle and the coupling to prevent the spindle from rotating independently of the coupling, and a disengaged position in which the splined portion of the disconnect shaft is disengaged from the splined portion of the coupling to allow the spindle to rotate independently of the coupling, the first disconnect shaft being arranged to be pulled outwardly to move from the first position to the second position. The modular assembly has a second disconnect configuration for use with a drive motor that is not mounted directly to the housing, the second disconnect configuration comprising a second coupling located adjacent to the inner end of the spindle, a sprocket or gear supported on the second coupling for connecting to the drive motor, and a second disconnect shaft having a splined portion and being moveable in an axial direction between an engaged position in which the splined portion of the second disconnect shaft mates with splined portions of both the spindle and the second coupling to prevent the spindle from rotating independently of the second coupling, and a disengaged position in which the splined portion of the disconnect shaft is disengaged from the splined portion of the spindle to allow the spindle to rotate independently of the second coupling, the second disconnect shaft being moveable inwardly from the engaged position to the disengaged position.

According to another aspect of the present invention, a spindle assembly is provided for use with a towable self-propelled vehicle, comprising: a main housing; a spindle mounted for rotation within the main housing; a wheel hub attached to the spindle; a coupling adapted to be connected to a source of power for propelling the vehicle; a disconnect shaft located within a bore of the coupling, the disconnect shaft being moveable in an axial direction between an engaged position in which a splined portion of the disconnect shaft mates with splined portions of both the spindle and the coupling to prevent the spindle from rotating independently of the coupling, and a disengaged position that allows the spindle to rotate relative to the coupling; and an actuator connected to an inner end of the disconnect shaft to move the disconnect shaft between its engaged and disengaged positions.

Numerous other objects and features of the present invention will be apparent to those skilled in this art from the following description wherein there is shown and described embodiments of the present invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIG. 6 is a perspective view of a spindle assembly according to the present invention.

FIG. 7 is an end view of the spindle assembly shown in FIG. 6.

FIG. 8 is a cross sectional view of the spindle assembly taken along the line 8-8 in FIG. 7.

DETAILED DESCRIPTION OF THE INVENTION

A spindle assembly 20 with a disconnect feature according to the present invention will be described in detail with reference to FIGS. 3 to 9 of the accompanying drawings.

The conventional spindle assembly 10 described above requires the hydraulic drive motor to be on the same centerline as the spindle 12 and disconnect shaft 14. Repositioning the hydraulic motor to a location where it is not directly mounted to the spindle assembly (offset centerlines) allows for the power input end of the spindle assembly 20 to be reconfigured. The addition of gears or sprockets to facilitate a speed reduction from the input at the motor to the output at the spindle assembly 20 is now possible, thus allowing improvement in vehicle handling.

Figure 3:
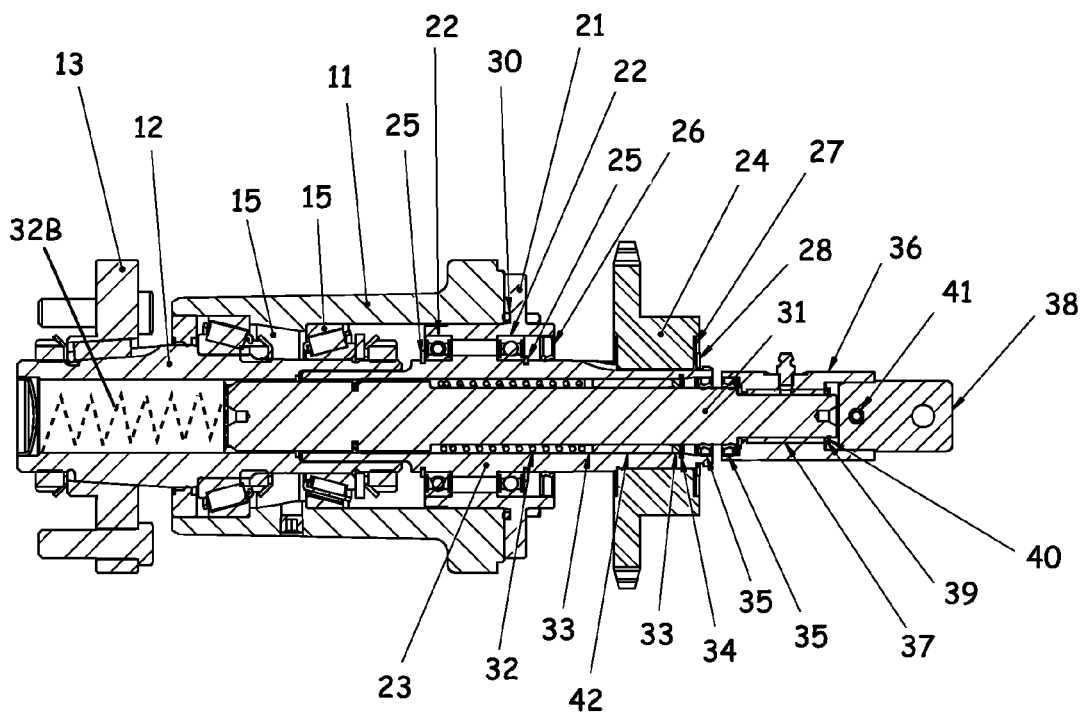
FIG. 3 is a cross section view of a spindle assembly with a disconnect feature according to the present invention.

As shown in FIG. 3, a sprocket drive assembly is attached to the spindle assembly 20. The sprocket drive assembly includes a subassembly housing 21, which is mounted into the main housing 11 of the spindle assembly 20. The sprocket drive assembly contains two bearings 22 for supporting a coupling 23 that extends out of the main housing 11 to a point where a sprocket 24 or gear (not shown) can be attached. The coupling 23 has a bore extending through a center thereof, and at least a portion of the bore has internal splines. Two retaining rings 25 keep the bearings 22 in location, and an oil seal 26 contains the lubricating fluid in the spindle assembly 20. A key 27 and a retaining ring 28 secure the sprocket 24 to the coupling 23. Four bolts 29 secure the subassembly housing 21 of the sprocket drive assembly to the main housing 11, and an o-ring 30 seals the two housings 11, 21 together. The vehicle's design will dictate the requirements for the drive configuration, which is variable by simply changing the input and output sprockets to suit the vehicle.

Figure 4:
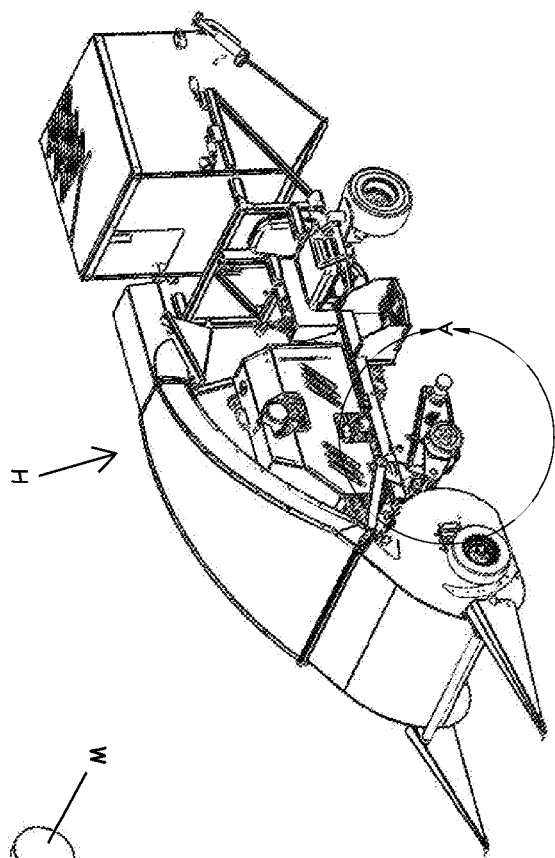
FIG. 4 is a perspective view of a towable forage harvester vehicle equipped with a spindle assembly according to the present invention.
Figure 5:
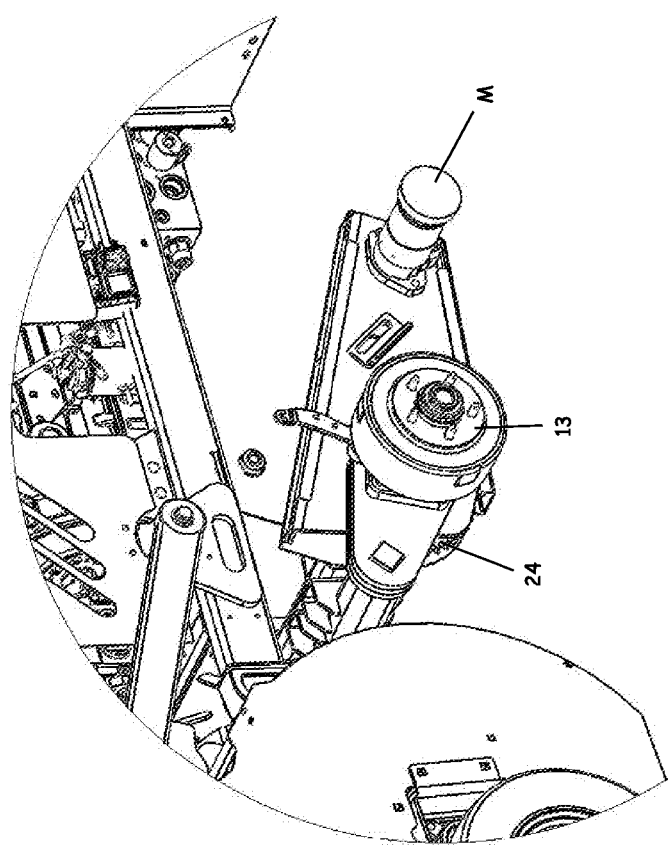
FIG. 5 is a detail view of the area A shown in FIG. 4.

For example, a towable, self-propelled plot harvester H is illustrated in FIGS. 4 and 5. The plot harvester H has a pair of front drive wheels (removed to better illustrate the invention) that are each mounted on a wheel hub 13 of a spindle assembly 20 according to the present invention. A drive motor M, such as a hydraulic drive motor, supplies power to each spindle assembly 20. For example, a sprocket (not shown) on the output shaft of the drive motor M and a sprocket 24 on the spindle assembly 20 can be connected by a roller chain or other suitable drive means to supply power to the spindle assemblies 20. The spindle assemblies 20 can be disengaged so that the wheel hubs 13 and spindles 12 can rotate freely relative to the coupling 23 without turning the drive motors M, thereby allowing the plot harvester H to be towed behind another vehicle.

Figure 9:
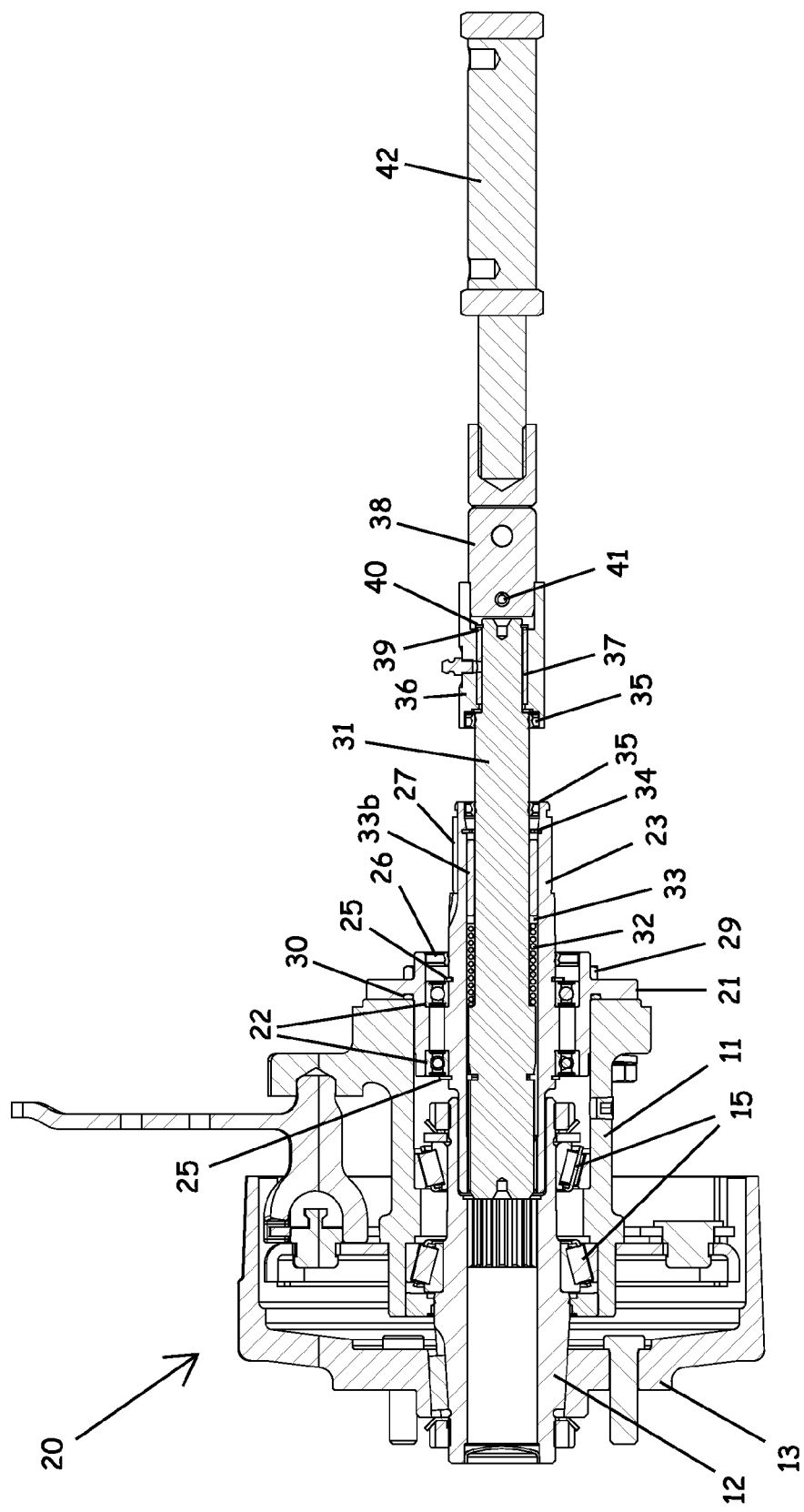
FIG. 9 is an enlarged cross sectional view of the spindle assembly similar to FIG. 8.

A disconnect shaft 31 is located within the bore of the coupling 23. The disconnect shaft 31 has a splined portion (i.e., external splines) and is moveable in an axial direction between an engaged position (FIG. 3) and a disengaged position (FIGS. 8 and 9). In the engaged position, the splined portion of the disconnect shaft 31 mates with the splined portions of both the spindle 12 and the coupling 23 to prevent the spindle 12 from rotating independently of the coupling 23. In the disengaged position, the splined portion of the disconnect shaft 31 is disengaged from the splined portion of the spindle 12 to allow the spindle 12 to rotate independently of the coupling 23.

Figure 1:
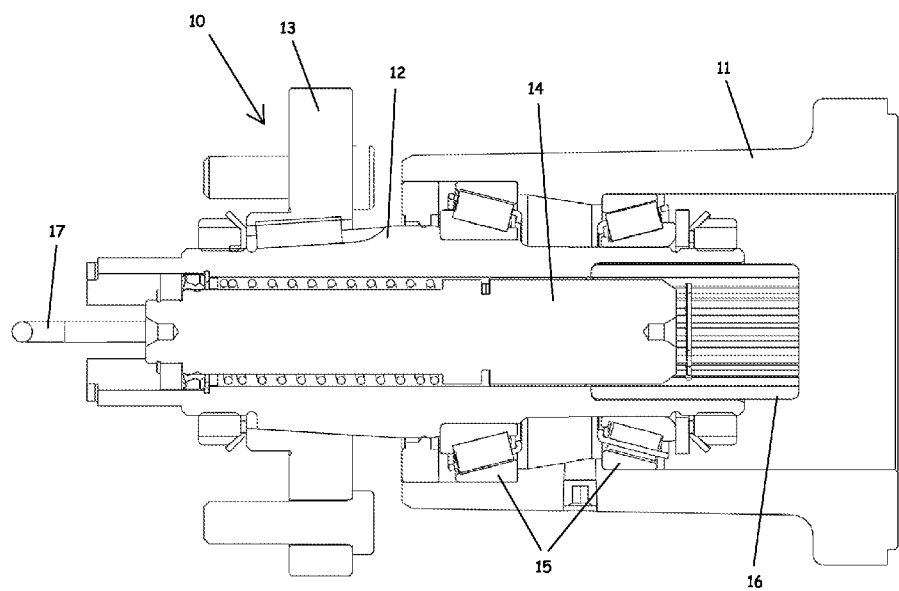
FIG. 1 is a cross section view of a conventional spindle assembly with a disconnect shaft in a connected position to provide a drive mode.
Figure 2:
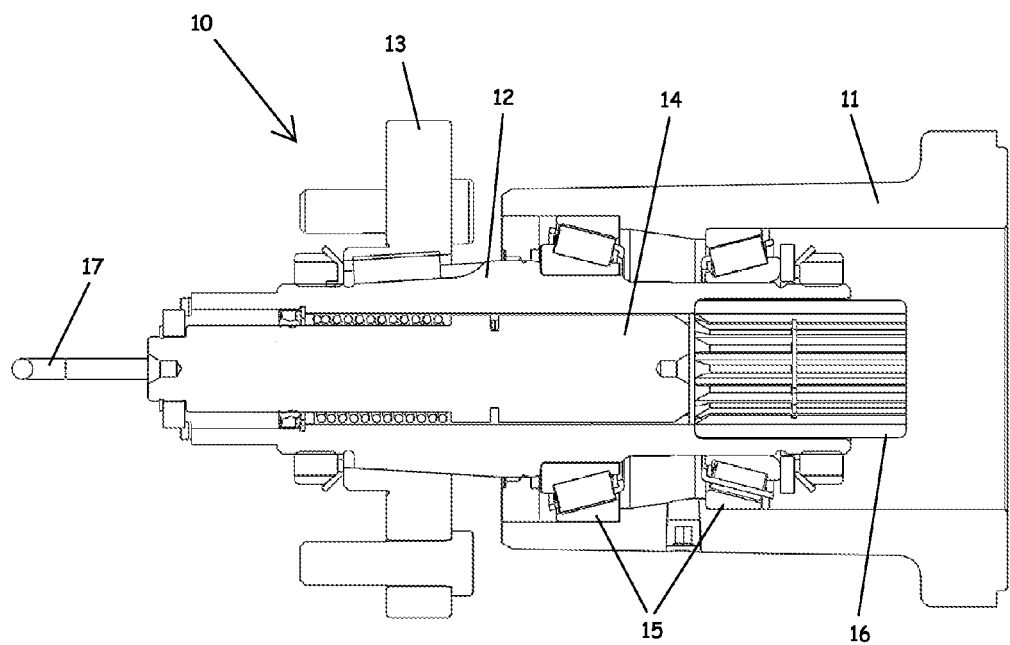
FIG. 2 is a cross section view of the conventional spindle assembly shown in FIG. 1, with the disconnect shaft in a disconnected position to provide a free-wheeling mode.

With the motor offset from the centerline of the spindle assembly 20 when it is driven by a sprocket 24, the disconnect shaft 31 can be positioned with an orientation that allows it to move inward towards the center of the vehicle, as opposed to being pulled outwards as in the conventional spindle assembly 10 shown in FIGS. 1 and 2. By locating the disconnect shaft 31 to pull inwards towards the center of the vehicle, a hydraulic cylinder, air cylinder, electronic or mechanical disconnection system for the spindle assembly 20 is possible without interference with tires or hindering the overall envelope of the vehicle. This arrangement also allows the disconnection of both spindle assemblies 20 (when more than one is located on a vehicle) at the same time, whereas in the conventional spindle assembly 10 only one spindle at a time can be disconnected when only one operator is present. The mechanism(s) used to disconnect the shaft 31 can be contained within the vehicle's body, therefore avoiding damage to the mechanism.

If the auto-disconnect option is chosen but the sprocket gear reduction is not required, the vehicle's designer can still allow for a sprocket drive option by having the motor positioned to allow for the disconnect shaft 31 to face inwards towards the center of the vehicle. If a gear reduction is not required, a 1:1 arrangement can still be utilized. If an auto disconnect option is used, a brake can be included with the spindle assembly to assure that the vehicle can be stopped. Such a brake may be particularly useful if the disconnect process is set up to be automatic once the vehicle's power is cut off.

The automatic disconnect used with the spindle assembly 20 is comprised of the disconnect shaft 31, a spring 32 for positive engagement when vehicle power at a job site is required, a washer 33 and retaining ring 34 to retain the spring 32, and an oil seal 35 to contain the lubricating liquid inside the spindle assembly 20. A bushing 33b supports the shaft 31 within the coupling 23 to facilitate sliding movement of the shaft between its engaged and disengaged positions.

Since the disconnect shaft 31 will only be spinning at low RPM while on the job site, a means of allowing the shaft 31 to rotate while the vehicle is under power is needed to separate the mechanical or electronic disconnection method. A housing 36 contains a bushing 37 that the disconnect shaft 31 rotates on. To pull the shaft 31 back for disconnect mode, a washer 39 and retaining ring 40 retain the housing 36 in location relative to the disconnect shaft 31. A dust seal 35 is added for containing lubrication around the bushing 37.

A clevis attachment 38 or other suitable structure is connected to the housing 36 by a spirol pin 41 or the like to provide a connection interface with a disengagement mechanism, such as an actuator 42. The actuator 42 is thus connected to an axially inner end of the disconnect shaft 31 and can be actuated to move the disconnect shaft 31 between its engaged position shown in FIG. 3, and its disengaged position shown in FIGS. 8 and 9. The actuator 42 can be a hydraulic cylinder, air cylinder or other electronic or mechanical system chosen by the vehicle manufacturer to meet the requirements for the vehicle.

The auto-disconnect can be configured in two ways, depending on end-user preference:

1. The disconnect shaft 31 can be arranged so that it has to be pulled out to disengage the unit, which is the configuration shown in FIGS. 3, 8 and 9. This option allows for a positive spring pressure assuring engagement of the disconnect shaft 31 into the spindle 12, and a means of pulling the shaft 31 to disengage the drive, which can be automated.
2. Alternatively, the disconnect shaft can be pushed out of the spindle 12 by a spring 32B (shown in dashed lines in FIG. 3) to disengage the unit. In this configuration, the disconnect shaft 31 is forced into the spindle 12 by some automatic method overcoming a positive spring pressure that would normally keep the unit disengaged. The spring 32B would automatically push the shaft 31 out of the spindle 12 if the machine's power is cut to assure disengagement of the drive.

As described herein, the spindle assembly 20 of the present invention is a modular design that uses the same main housing 11, spindle 12, bearings 15 and wheel hub 13 as used in the conventional spindle assembly 10. The subassembly housing 21, bearings 22, coupling 23, and disconnect shaft 31 are made to attach to the existing main housing 11 and to mate with the existing spindle 12, as shown in the drawings. The modular design is a unique aspect of the present invention, which makes the spindle assembly 20 more efficient to manufacture and to provide as an option for vehicle manufacturers.

While the invention has been specifically described in connection with specific embodiments thereof, it is to be understood that this is by way of illustration and not of limitation, and the scope of the application should be construed as broadly as the prior art will permit.

What is claimed is:

1. A spindle assembly for use in a drive system of a vehicle, comprising:
    a main housing having an outer side and an inner side;
    a spindle mounted for rotation within said housing, said spindle having an outer end and an inner end and a first bore extending between said outer and inner ends, said outer end protruding from said outer side of said housing, and at least a portion of said first bore having splines;
    a wheel hub attached to said spindle adjacent to said outer end;
    a coupling located adjacent to said inner end of said spindle, said coupling having a second bore extending through a center thereof, and at least a portion of said second bore having splines;
    a disconnect shaft located within said second bore of the coupling, said disconnect shaft having a splined portion and being moveable in an axial direction between an engaged position in which said splined portion of the disconnect shaft mates with the splined portions of both said spindle and said coupling to prevent said spindle from rotating independently of said coupling, and a disengaged position in which said splined portion of the disconnect shaft is disengaged from the splined portion of said spindle to allow said spindle to rotate independently of said coupling; and a disengagement mechanism connected to an axially inner end of the disconnect shaft to move the disconnect shaft between its engaged and disengaged positions.

2. A spindle assembly for use in a drive system of a vehicle, comprising:

a main housing having an outer side and an inner side;

a spindle mounted for rotation within said housing, said spindle having an outer end and an inner end and a first bore extending between said outer and inner ends, said outer end protruding from said outer side of said housing, and at least a portion of said first bore having splines;

a wheel hub attached to said spindle adjacent to said outer end;

a coupling located adjacent to said inner end of said spindle, said coupling having a second bore extending through a center thereof, and at least a portion of said second bore having splines; and a disconnect shaft located within said second bore of the coupling, said disconnect shaft having a splined portion and being moveable in an axial direction between an engaged position in which said splined portion of the disconnect shaft mates with the splined portions of both said spindle and said coupling to prevent said spindle from rotating independently of said coupling, and a disengaged position in which said splined portion of the disconnect shaft is disengaged from the splined portion of said spindle to allow said spindle to rotate independently of said coupling;

further comprising a subassembly housing connected to said main housing, said coupling being supported for rotation within said subassembly housing by at least one bearing located between said coupling and said subassembly housing.

3. The spindle assembly according to claim 2, wherein said subassembly housing is connected to said inner side of said main housing by a plurality of bolts, and further comprising an o-ring seal sandwiched between said main housing and said subassembly housing.

4. The spindle assembly according to claim 3, wherein said spindle is supported for rotation within said main housing by at least one bearing located between said coupling and said main housing.

5. The spindle assembly according to claim 4, further comprising a first oil seal arranged to create a seal between said outer end of said main housing and an outer surface of said spindle, and a second oil seal arranged to create a seal between an inner end of said subassembly housing and an outer surface of said coupling, wherein a lubricating liquid chamber is provided within said housings between said first and second seals for lubricating said bearings.

6. The spindle assembly according to claim 5, further comprising a sprocket or gear connected to an inner end of said coupling.

7. The spindle assembly according to claim 5, further comprising a spring arranged to bias said disconnect shaft in an axial direction toward said engaged position.

8. The spindle assembly according to claim 5, further comprising a spring arranged to bias said disconnect shaft in an axial direction toward said disengaged position.

9. The spindle assembly according to claim 5, further comprising a spring arranged to bias said disconnect shaft in an axial direction, a retaining ring arranged in a groove within the bore of said coupling to retain the spring, and an oil seal arranged to form a seal between an outer surface of said disconnect shaft and the second bore of said coupling to contain lubricating liquid within said spindle assembly.

10. The spindle assembly according to claim 9, further comprising an automatic disconnect interface assembly connected to an inner end of said disconnect shaft, said disconnect interface assembly comprising a disconnect housing with a mounting plate that provides an interface for connecting the disconnect shaft to a disengagement mechanism, said disconnect housing being rotatably mounted on the inner end of said disconnect shaft to allow said disconnect shaft to rotate while said disconnect housing remains stationary.

11. A modular spindle assembly for use in a drive system of a vehicle, comprising:

a main housing having an outer side and an inner side;

a spindle mounted for rotation within said housing, said spindle having an outer end and an inner end and a first bore extending between said outer and inner ends, said outer end protruding from said outer side of said housing, and at least a portion of said first bore having splines;

a wheel hub attached to said spindle adjacent to said outer end;

a first disconnect configuration for use with a first drive motor mounted directly to the housing, said first disconnect configuration comprising a first coupling located adjacent to said inner end of said spindle for engaging with the first drive motor, and a first disconnect shaft having a splined portion and being moveable in an axial direction between a first engaged position in which said splined portion of the first disconnect shaft mates with splined portions of both said spindle and said coupling to prevent said spindle from rotating independently of said coupling, and a first disengaged position in which said splined portion of the disconnect shaft is disengaged from the splined portion of said coupling to allow said spindle to rotate independently of said coupling, said first disconnect shaft being arranged to be pulled outwardly to move from said first engaged position to said first disengaged position; and a second disconnect configuration for use with a second drive motor that is not mounted directly to the housing, said second disconnect configuration comprising a second coupling located adjacent to said inner end of said spindle, a sprocket or gear supported on said second coupling for connecting to said second drive motor, and a second disconnect shaft having a splined portion and being moveable in an axial direction between a second engaged position in which said splined portion of the second disconnect shaft mates with splined portions of both said spindle and said second coupling to prevent said spindle from rotating independently of said second coupling, and a second disengaged position in which said splined portion of the disconnect shaft is disengaged from the splined portion of said spindle to allow said spindle to rotate independently of said second coupling, said second disconnect shaft being moveable inwardly from said second engaged position to said second disengaged position.

12. A spindle assembly for use with a towable self-propelled vehicle, comprising:

a main housing;

a spindle mounted for rotation within the main housing;

a wheel hub attached to the spindle;

a coupling adapted to be connected to a source of power for propelling the vehicle;

a disconnect shaft located within a bore of the coupling, said disconnect shaft being moveable in an axial direction between an engaged position in which a splined portion of the disconnect shaft mates with splined portions of both the spindle and the coupling to prevent the spindle from rotating independently of the coupling, and a disengaged position that allows the spindle to rotate relative to the coupling; and an actuator connected to an axially inner end of the disconnect shaft to move the disconnect shaft between its engaged and disengaged positions.

13. The spindle assembly according to claim 12, further comprising a sprocket or gear connected to an inner end of the coupling to connect the coupling to a drive motor.

14. The spindle assembly according to claim 12, wherein said actuator comprises a linear actuator connected to the inner end of the disconnect shaft by a structure that allows the disconnect shaft to rotate relative to the actuator.

15. The spindle assembly according to claim 12, wherein said wheel hub is attached to an outer end of the spindle, and said splined portion of the spindle is located at an inner end of the spindle.

16. The spindle assembly according to claim 15, wherein said splined portion of the coupling is located at an outer end of the coupling, and a sprocket or gear is connected to an inner end of the coupling to connect the coupling to a drive motor.

17. The spindle assembly according to claim 16, wherein said disconnect shaft protrudes inwardly from an inner end of the coupling.

18. The spindle assembly according to claim 12, further comprising a spring arranged to bias said disconnect shaft in an axial direction toward said engaged position.

19. The spindle assembly according to claim 12, further comprising a spring arranged to bias said disconnect shaft in an axial direction toward said disengaged position.

20. The spindle assembly according to claim 12, further comprising a subassembly housing connected to said main housing, said coupling being supported for rotation within said subassembly housing by at least one bearing located between said coupling and said subassembly housing, and wherein said spindle is supported for rotation within said main housing by at least one bearing located between said coupling and said main housing.

* * * * *